E. J. BLOOD & A. D HAGER.
Harvester-Cutters.
No. 158,462. Patented Jan. 5, 1875.
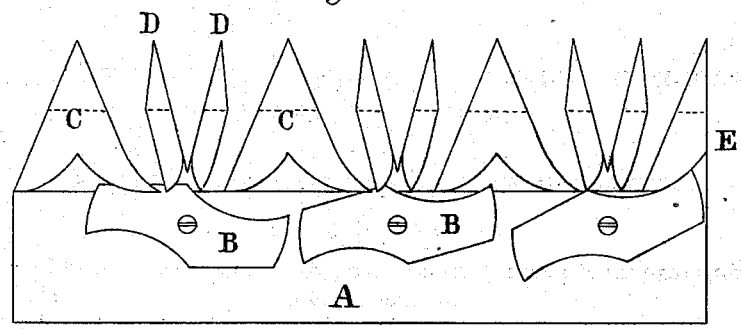
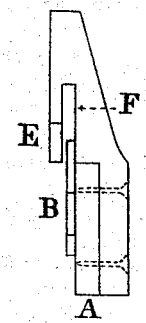
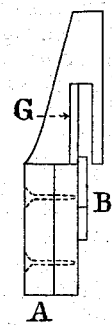

UNITED STATES PATENT OFFICE.

EDWIN J. BLOOD, OF VERNON, WISCONSIN, AND ALBERT D. HAGER, OF CHICAGO, ILLINOIS.

IMPROVEMENT IN HARVESTER-CUTTERS.

Specification forming part of Letters Patent No. 158,462, dated January 5, 1875; application filed September 8, 1874.

*To all whom it may concern:*

Be it known that we, EDWIN J. BLOOD, of Vernon, in the county of Waukesha and State of Wisconsin, and ALBERT D. HAGER, of Chicago, in the county of Cook, in the State of Illinois, have invented certain Improvements in Finger-Guards for Reapers, of which the following is a specification:

The object of our invention is to provide a reaper with a finger-bar with alternate fingers, a wide one at the base, with the right tail rounded out more than the left, and narrow fingers between the wide ones, straight on the two sides facing each other, and made on an angle on the opposite sides, with an outside finger at the end of the bar, straight on the outside, and slanting on the inside, with revolving knives to cut between the fingers.

Figure 1 is a plan view of our invention; Fig. 2, an edge view of the finger, showing the knife-opening small where the knife enters; and Fig. 3, an edge view of the finger with the opening larger, or with a wide opening on the side where the knife leaves the finger.

A is the finger-bar; B B B, the knives; C C C, wide fingers, with the right tail of the cover rounded out more than the left, so as to approach one of the narrow fingers; D, the narrow fingers between the wide ones, straight on the sides facing each other, and made on an angle on the opposite sides; E, the finger at the end of the bar, made straight on the outside, and running in toward the narrow finger on the inside; F, opening for the knife on the edge of the finger, made just wide enough to let the knife pass through; G, opening on the other side, made larger and wider where the knife leaves the finger, to prevent the knife from clogging.

This apparatus operates as follows: The knives are run by any machinery that will revolve them, and as the grain is gathered in between the fingers, the knives, striking in between the fingers, cut the grain with a shearing motion.

We claim as our invention—

A finger-guard composed of alternate fingers C D D, constructed as shown and described, and finger E, with straight and slanting sides, when combined and arranged to operate, in connection with knives B, in the manner substantially as and for the purpose set forth.

EDWIN J. BLOOD.
ALBERT D. HAGER.

Witnesses to E. J. BLOOD:
   J. B. SMITH,
   E. J. SMITH.

Witnesses to ALBERT D. HAGER:
   D. W. C. TANNER,
   A. E. GAY.